US009328806B2

(12) United States Patent
Noguchi et al.

(10) Patent No.: US 9,328,806 B2
(45) Date of Patent: May 3, 2016

(54) STRUCTURE OF POWER TRANSMISSION APPARATUS

(71) Applicant: DENSO CORPORATION, Kariya, Aichi-pref. (JP)

(72) Inventors: Hitoshi Noguchi, Handa (JP); Hiroshi Okada, Kariya (JP); Shuzo Oda, Kariya (JP); Tomoaki Nakano, Toyoto (JP); Yoshihiro Yamashita, Anjo (JP); Yousuke Yamamoto, Kariya (JP); Kazuhisa Hara, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/571,796

(22) Filed: Dec. 16, 2014

(65) Prior Publication Data
US 2015/0167796 A1    Jun. 18, 2015

(30) Foreign Application Priority Data

Dec. 17, 2013  (JP) ................................. 2013-259996

(51) Int. Cl.
*F16H 7/22* (2006.01)
*F16H 7/12* (2006.01)
*B60W 20/00* (2016.01)
*F02N 15/02* (2006.01)
*F16H 7/08* (2006.01)
*F02N 11/04* (2006.01)
*F02N 15/08* (2006.01)

(52) U.S. Cl.
CPC ............. *F16H 7/1281* (2013.01); *B60W 20/00* (2013.01); *F02N 15/02* (2013.01); *F02N 11/04* (2013.01); *F02N 15/08* (2013.01); *F16H 2007/0861* (2013.01); *F16H 2007/0885* (2013.01); *Y10S 903/909* (2013.01); *Y10T 477/23* (2015.01)

(58) Field of Classification Search
None
See application file for complete search history.

(56) References Cited

U.S. PATENT DOCUMENTS

| 6,834,228 | B2* | 12/2004 | Serkh ...................... | F02B 67/06 123/195 A |
| 6,953,407 | B2* | 10/2005 | Kitamura ................ | F02B 67/06 474/109 |
| 8,845,487 | B2* | 9/2014 | Mueller .................. | F02B 67/06 477/44 |
| 8,914,190 | B2* | 12/2014 | Detrois ................... | F02B 67/06 701/1 |
| 9,151,366 | B2* | 10/2015 | Antchak ................ | B60K 25/02 |

(Continued)

FOREIGN PATENT DOCUMENTS

| JP | 2003-314322 | 11/2003 |
| JP | 2006-299844 | 11/2006 |
| JP | 2013-224696 | 10/2013 |

(Continued)

*Primary Examiner* — Dirk Wright
(74) *Attorney, Agent, or Firm* — Nixon & Vanderhye P.C.

(57) ABSTRACT

A power transmission system transmits power from a drive shaft of an internal combustion engine to a first and a second auxiliary device through a belt. An auto-tensioner extends or contracts to change the tension of the belt. A controller rotates the first auxiliary device in a reverse direction to loosen the belt to cause the auto-tensioner to extend to increase the tension of the belt and calculates a reversing timing when the drive shaft will be reversed as a result of increasing of the tension of the belt. The controller inhibits the tensioner body from contracting immediately before or when the reversing time is reached to keep the tension of the belt at an increased degree, thereby eliminating the slippage of the belt on each pulley without having to finely control the operation of the first auxiliary device when the internal combustion engine is started.

11 Claims, 6 Drawing Sheets

(56) References Cited

U.S. PATENT DOCUMENTS

2013/0276576 A1    10/2013    Noguchi et al.
2015/0167797 A1*   6/2015     Noguchi ............... F16H 7/1281
                                                              477/3

FOREIGN PATENT DOCUMENTS

| JP | 2014-058900 | 4/2014 | |
| WO | WO 2013003937 A1 * | 1/2013 | ............ F16H 7/1263 |

* cited by examiner

STRUCTURE OF POWER TRANSMISSION APPARATUS

CROSS REFERENCE TO RELATED DOCUMENT

The present application claims the benefit of priority of Japanese Patent Application No. 2013-259996 filed on Dec. 17, 2013, the disclosure of which is incorporated herein by reference.

BACKGROUND OF THE INVENTION

1. Technical Field

This disclosure relates generally to a power transmission apparatus designed to transmit power, as produced by an internal combustion engine, to auxiliary devices.

2. Background Art

There are known power transmission systems which work to transmit output power of an internal combustion engine to a given accessory and other accessories mounted in, for example, an automobile using an endless transmitting member such as a belt. The given accessory is used as, for instance, an engine starter to start the internal combustion engine. The given accessory may be rotated by the output power of the internal combustion engine along with the other accessories in a regenerative mode of operation to generate electricity. Japanese Patent First Publication No. 2006-299844 teaches the above type of power transmission system which has an auto-tensioner disposed between a driving pulley and a pulley of one of the accessories (which will also be referred to as an accessory pulley below) to adjust the degree of tension of the endless transmitting member to a required level.

The auto-tensioner of the power transmission system, as taught in the above publication, is equipped with a tensioner pulley, a tensioner body, a biasing mechanism, and a stroke inhibitor. The tensioner pulley is placed in contact with the endless transmitting member between the driving pulley and the accessory pulley and movable relative to the internal combustion engine. The tensioner body is capable of contracting or extending in a given direction to move the tensioner pulley relative to the engine. The biasing mechanism urges the tensioner body to extend at all times. The stroke inhibitor serves to hold the tensioner body from contracting.

The auto-tensioner works to extend or contract the tensioner body to move the tensioner pulley relative to the engine, thereby regulating a degree of tension of the endless transmitting member. Specifically, the auto-tensioner is capable of eliminating the loosening of the endless transmitting member between the driving pulley and the accessory pulley when the given accessory operates in a regenerative mode. When the given accessory operates in a power mode, it will result in an increase in tension of the endless transmitting member between the driving pulley and the accessory pulley, which moves the tensioner pulley to a given position. When the tensioner pulley reaches the given position, the torque, as produced by the given accessory, is transmitted through the endless transmitting member to a drive shaft of the internal combustion engine to crank the internal combustion engine.

The power transmission system is designed to sequentially execute a reverse rotation control step, a stroke inhibition step, and an engine start step. When or after an engine stop condition is met, the reverse rotation control step is executed to rotate the given accessory in the reverse direction to loosen the endless transmitting member between the driving pulley and the accessory pulley, thereby causing the tensioner body to extend in the given direction. The stroke inhibition step is to control the operation of the stroke inhibitor to hold the tensioner body from contracting. The engine start step is to operate the given accessory in the power mode to crank the internal combustion engine. Specifically, the power transmission system works to extend the tensioner body to increase the degree of tension of the endless transmitting member in the reverse rotation control step and then hold the tensioner body from contracting in the stroke inhibition step, thereby keeping the tension of the endless transmitting member at an increased degree to eliminate slippage of the endless transmitting member on each of the pulleys when it is required to operate the given accessory in the power mode to start the internal combustion engine.

The power transmission system is, however, required to finely control the operation of the given accessory to output a degree of torque within a range which is higher than that permitting the tensioner body to extend in the given direction and is lower than that causing the drive shaft to start rotating in the reverse direction. When the above torque range is narrow, it results in a difficulty in keeping the output, as produced by the given accessory, within the torque range at all times.

When the torque, as produced by the given accessory which reverses in the reverse rotation control step, is lower than that causing the tensioner body to extend in the given direction, it will result in a difficulty in increasing the tension of the endless transmitting member to a required degree, which may lead to the slippage of the endless transmitting member on each of the pulleys. Alternatively, when the torque, as produced by the given accessory which reverses in the reverse rotation control step, is greater than that causing the drive shaft to be reversed, it will cause the internal combustion engine to be reversed.

SUMMARY

It is therefore an object to provide an improved structure of a power transmission system designed to minimize slippage of an endless transmitting member on a pulley without having to finely control an operation of an auxiliary device when it is required to start an internal combustion engine.

According to one aspect of the invention, there is provided a power transmission system which works to transmit power, as produced by an internal combustion engine, to a first auxiliary device and a second auxiliary device. The first auxiliary device is operable either in a motor mode or in a regenerative mode. The power transmission system comprises: (a) a driving pulley which is joined to a drive shaft of the internal combustion engine to be rotatable along with rotation of the drive shaft; (b) a first auxiliary device pulley which is joined to a shaft of the first auxiliary device to be rotatable along with rotation of the shaft of the first auxiliary device; (c) a second auxiliary device pulley which is joined to a shaft of the second auxiliary device to be rotatable along with rotation of the shaft of the second auxiliary device; (d) an endless transmitting member which is wound around the driving pulley, the first auxiliary device pulley, and the second auxiliary device pulley; (e) a tensioner pulley which is rotatable in contact with the endless transmitting member, the tensioner pulley being also movable relative to the internal combustion engine; (f) an auto-tensioner which is equipped with a tensioner body, the tensioner body working to extend or contract in a given direction to move the tensioner pulley relative to the internal combustion engine, thereby changing a degree of tension of the endless transmitting member; (g) a biasing mechanism which biases the tensioner body to extend in the given direction; and (h) a stroke inhibitor which works to inhibit the tensioner body from contracting. The auto-tensioner may work to eliminate slippage of the endless transmitting member between the driving pulley and the first auxiliary device pulley or between the driving pulley and the second auxiliary device pulley when the first auxiliary device operates in the regenerative mode.

The power transmission system also includes a controller which operates in a reverse rotation control mode, a stroke inhibition mode, an engine start mode, and an inhibition releasing mode. The reverse rotation control mode is entered when or after an engine stop condition to stop the internal combustion engine is met to rotate the first auxiliary device in a reverse direction that is opposite a direction in which the first auxiliary device rotates in the power mode, thereby loosening the endless transmission member between the driving pulley and the first auxiliary device pulley to cause the tensioner body to extend in the given direction for increasing the tension of the endless transmitting member. The stroke inhibition mode is to control an operation of the stroke inhibitor to inhibit the tensioner body from contracting. The engine start mode is to operate the first auxiliary device in the power mode to start the internal combustion engine. The inhibition releasing mode is to control the operation of the stroke inhibitor to permit the first auxiliary device to contract. The controller calculates a reversing timing when the drive shaft is expected to start being reversed by an operation of the reverse rotation control mode. The controller controls the operation of the first auxiliary device based on the reversing timing in the reverse rotation control mode.

Specifically, the controller controls the operation of the first auxiliary device so as to extend the tensioner body in the given direction for increasing the tension of the endless transmitting member in the reverse rotation control mode. This keeps the tension of the endless transmitting member increased when it is required to start the first auxiliary device to operate in the motor mode in the engine start mode, thereby minimizing the slippage of the endless transmitting member on each of the first and second auxiliary device pulleys when the internal combustion engine is cranked.

After the internal combustion engine starts, the controller enters the inhibition releasing mode to cause the tensioner body to contract, thereby decreasing the tension of the endless transmitting member which has been increased by reverse rotation of the first auxiliary device in the reverse rotation control mode. This avoids an undesirable increase in frictional resistance of the endless transmitting member on each of the first and second auxiliary device pulleys and minimizes the wear or damage to the endless transmitting member.

The controller, as already described, works to predict the reversing timing when the drive shaft (i.e., the internal combustion engine) will start being reversed and control the operation of the first auxiliary device based on the reversing timing in the reverse rotation control mode. Specifically, the controller stops the reverse rotation of the first auxiliary device immediately before or at the moment when the reversing timing is reached, thereby keeping the tensioner body at a desired extended position without causing the drive shaft to rotate in the reverse direction. This eliminates the need for finely controlling the operation of the first auxiliary device to output a degree of torque within a range which is higher than that permitting the tensioner body to extend in the given direction thereof and is lower than that causing the drive shaft to rotate in the reverse direction. The power transmission system is, therefore, capable of controlling the slippage of the endless transmitting member on each of the first and second auxiliary device pulleys without having to finely control the operation of the first auxiliary device when the internal combustion engine is started.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
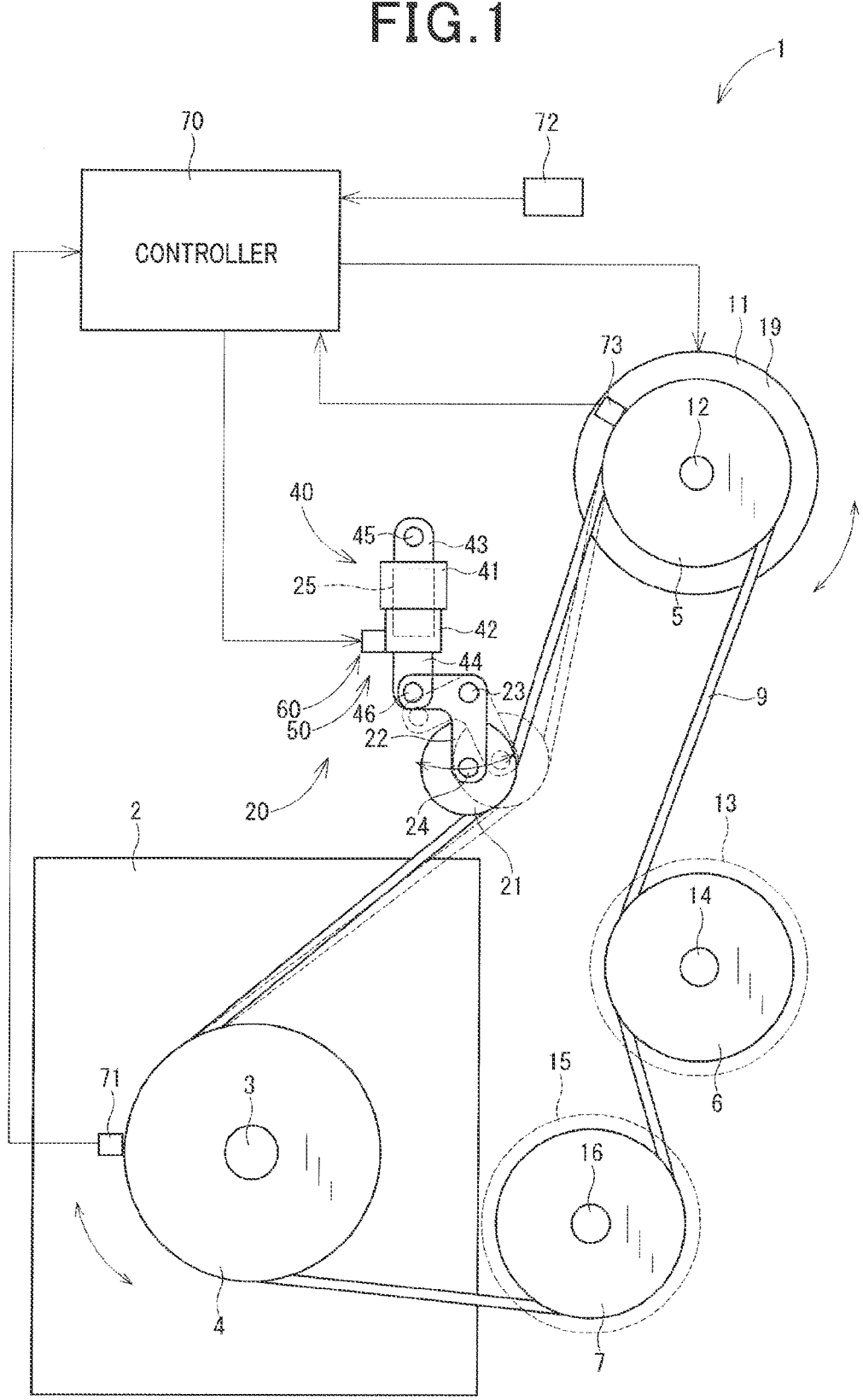
FIG. 1 is a schematic view which illustrates a power transmission system according to a first embodiment.

Referring to the drawings, wherein like reference numbers refer to like parts in several views, there are shown power transmission systems according to embodiments.

First Embodiment

FIG. 1 illustrates a power transmission system 1 according to the first embodiment. The power transmission system 1, as referred to herein, is installed in an automotive vehicle, not shown, which is equipped with an internal combustion engine 2. The power transmission system 1 works to transmit output power (i.e., torque), as produced by the engine 2, to a given accessory 11 and other accessories 13 and 15 mounted in the vehicle. The accessories 11, 13, and 15, as referred to herein, are auxiliary electric or mechanical devices which are supplied with or transmit power or torque from or to the internal combustion engine 2. The given accessory 11 will also be referred to below as a first auxiliary device. The accessories 13 and 15 will also be referred to below as second auxiliary devices.

The power transmission system 1 is, as clearly illustrated in FIG. 1, disposed near the engine 2. The power transmission system 1 includes a driving pulley 4, a given accessory pulley 5, accessory pulleys 6 and 7, a belt 9 (i.e., an endless transmitting member), a auto-tensioner 20, and an electronic control unit (ECU) 70 working as a controller. The given accessory pulley 5 will also be referred to below as a first auxiliary device pulley. The accessory pulleys 6 and 7 will also be referred to below as second auxiliary device pulleys.

The driving pulley 4 is in the shape of a disc and joined at the center thereof to a drive shaft 3 (i.e., an output shaft) of the engine 2, so that the driving pulley 4 is rotatable following rotation of the drive shaft 3. The given accessory pulley 5 is in the shape of a disc and joined at the center thereof to a shaft 12 of the given accessory 11, so that the given accessory pulley 5 is rotatable along with the shaft 12. The accessory pulleys 6 and 7 are each in the shape of a disc and joined at centers thereof to shafts 14 and 16 the accessories 13 and 15, so that they are rotatable along with the accessories 13 and 15.

The drive shaft 3 has an end joined to an input shaft of a transmission (i.e., a controlled object) installed in the vehicle through, for example, a clutch (not shown) on the opposite side to the driving pulley 4. The transmission is joined at an output shaft thereof to an axle of the vehicle through a differential gear (not shown). When the clutch connects between the drive shaft 3 and the input shaft of the transmission, rotation of the drive shaft 3 is transmitted to driving wheels attached to ends of the axle through the output shaft of the transmission, the differential gear, and the axle, thereby running the vehicle.

The belt 9 is made of, for example, rubber or wire in the shape of an endless loop. The belt 9 expands or contracts elastically when subjected to an external force. The belt 9 is wound around the driving pulley 7, the given accessory pulley 5, and the accessory pulleys 6 and 7. Rotation of the driving pulley 4 will be, therefore, transmitted to the accessory pulleys 7 and 6 and the given accessory pulley 5, so that they rotate. In other words, the rotation of each of the driving pulley 4, the accessory pulleys 7 and 6 and the given accessory pulley 5 is transmitted through the belt 9 to another. In the example illustrated in FIG. 1, when the engine 2 is running in a normal mode of operation, the direction of rotation of the drive shaft 3, i.e., the driving pulley 4 is a clockwise direction. The belt 9, the driving pulley 7, the given accessory pulley 5, and the accessory pulleys 6 and 7, thus, rotate in the clockwise direction. In the following discussion, the clockwise direction, as viewed in FIG. 1, will also be referred to as a normal direction, while a counterclockwise direction will also be referred to as a reverse direction below.

The given accessory 11, as referred to in this embodiment, is a motor-generator which selectively operations in two modes: a motor mode (also called a power mode) and a regenerative mode. In the motor mode, the motor-generator is supplied with electric power from, for example, a battery installed in the vehicle, so that the shaft 12 rotates. In the regenerative mode, torque is inputted to the shaft 12, so that the motor-generator generates electricity. Specifically, the given accessory 11 works as a starter to start the engine 2. When the engine 2 is at rest, and it is required to start the engine 2, the given accessory 11 enters the motor mode and rotates the driving pulley 4 to crank the engine 2.

When the engine 2 is running, that is, the belt 8 is rotating, the given accessory 11 also works as an assist motor in the motor mode. Specifically, the given accessory 11 gives additional rotation to the drive shaft 3 through the driving pulley 4 to assist in accelerating the vehicle.

When the engine 2 is running, that is, the belt 8 is rotating, and it is required to operate the given accessory 11 in the regenerative mode, the given accessory 11 works as a generator and is supplied with torque through the driving pulley 5, so that the given accessory 11 produces electric energy and stores it in, for example, the battery mounted in the vehicle.

As apparent from the above discussion, the given accessory 11 is implemented by a multifunctional device such as an ISG (Integrated Starter Generator).

The accessories 13 and 15 are, for example, a water pump and an air conditioner compressor and driven by input of torque to the shafts 14 and 16, respectively. In other words, the accessories 13 and 15 are driven following the rotation of the belt 9.

In the power transmission system 1, a maximum loosened position of the belt 9 where the belt 9 is loosened greatest, in other words, the degree of tension of the belt 9 is the smallest usually changes with an operation of the given accessory 11. For instance, when the given accessory is in the motor mode, the maximum loosened position of the belt 9 lies between the given accessory pulley 5 and the accessory pulley 6. When the given accessory is in the regenerative mode, the maximum loosened position of the belt 9 lies between the driving pulley 4 and the given accessory pulley 5. The tension of the belt 9 also changes with the operation of the given accessory 11.

The auto-tensioner 20 includes a tensioner pulley 21, an arm 22, a tensioner body 40, a coil spring 25 working as a biasing mechanism, and a stroke inhibitor 50.

The tensioner pulley 21 is in the shape of a disc and placed in contact with the belt 9 between the driving pulley 4 and the given accessory pulley 5.

The arm 22 is substantially of an L-shape and has shafts 23 and 24. The shaft 23 is secured to a wall surface of a body of the vehicle near the engine 2 and bears the center of the arm 22, so that the arm 22 is rotatable about the shaft 23 relative to the engine 1. The shaft 24 is joined to the end of the arm 22 and bears the center of the tensioner pulley 21 to be rotatable. With the above arrangements, the tensioner pulley 21 is rotatable in contact with the belt 9 between the driving pulley 4 and the given accessory pulley 5 and movable or swingable about the shaft 23 relative to the engine 2.

Figure 2:
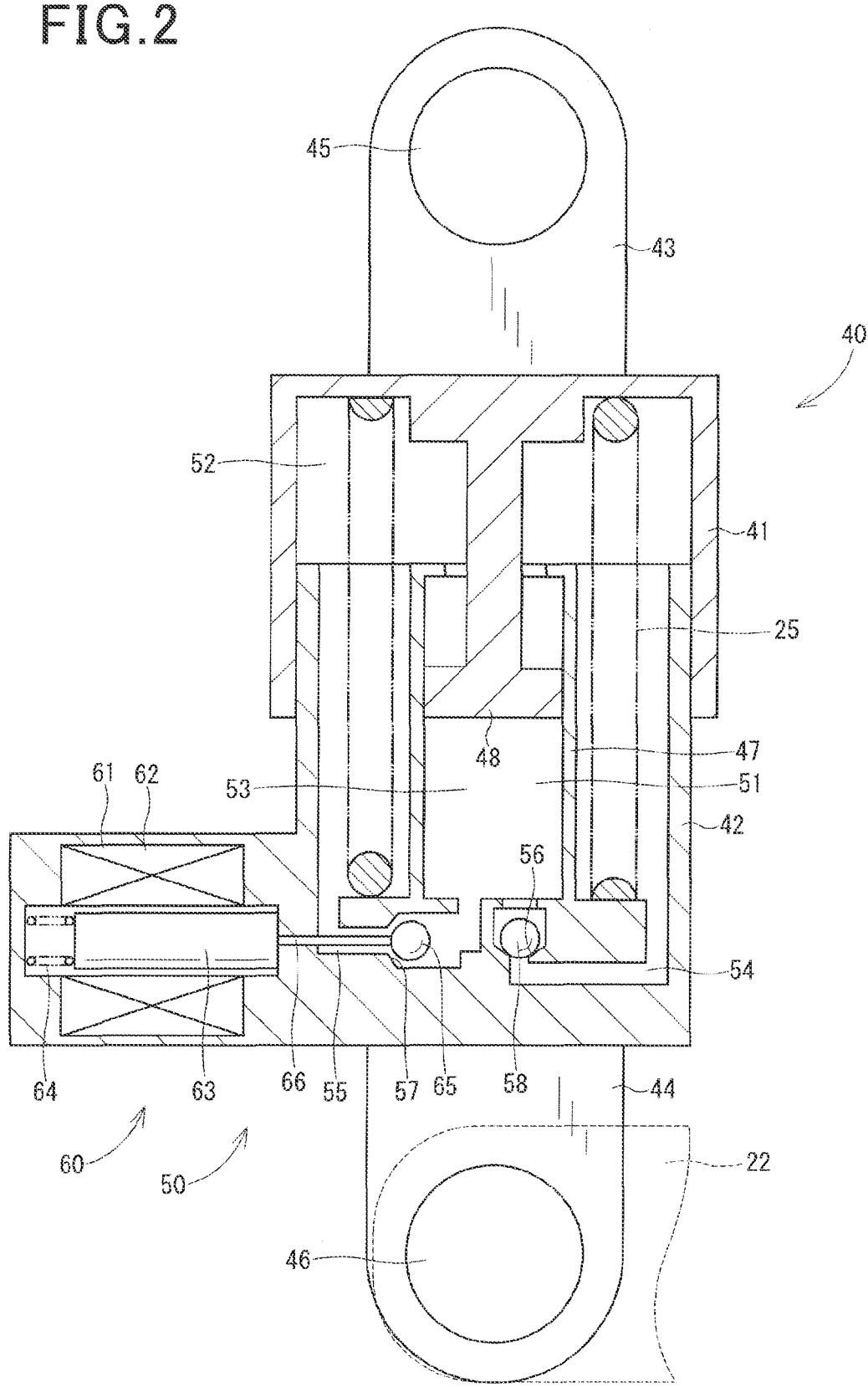
FIG. 2 is a longitudinal sectional view which illustrates a tensioner body installed in the power transmission system of FIG. 1.

The tensioner body 40, as clearly illustrated in FIG. 2, includes an upper body 41, a lower body 42, extensions 43 and 44, shafts 45 and 46, a hollow cylinder 47, and a piston 48.

The upper body 41 is in the shape of a hollow cylinder with a bottom. Similarly, the lower body 42 is in the shape of a hollow cylinder with a bottom. The lower body 42 has an open end which faces the bottom thereof and is disposed inside the upper body 41. Specifically, the lower body 42 is arranged in slidable contact at an outer wall of the open end thereof with an inner wall of the upper body 41, so that it is movable in an axial direction of the upper body 41. The extension 43 extends from the bottom of the upper body 41 away from the lower body 42. The extension 44 extends from the bottom of the lower body 42 away from the upper body 41.

The shaft 45 is secured at an end thereof to the wall surface of the body of the vehicle near the engine 2 and bears at the other end thereof an end of the extension 43 farther away from the upper body 41, so that the tensioner body 40 is swingable about the shaft 45 relative to the engine 2. Similarly, the shaft 46 is secured at an end thereof to an end of the extension 44 which is farther away from the lower body 42 and rotatably bears an end of the arm 22 which is farther away from the tensioner pulley 21. When the upper body 41 and the lower body 42 are moved relative to each other, so that the tensioner body 40 extends or contracts in the axial direction thereof, it will cause the arm 22 to turn about the shaft 23 to change the location of the tensioner pulley 21 relative to the engine 2, thereby changing the degree of tension of the belt 9 between the driving pulley 4 and the given accessory pulley 5.

The cylinder 47 is disposed inside lower body 42 and extends from the bottom of the lower body 42 toward the upper body 41. The cylinder 47 may be formed integrally with the lower body 42. The piston 48 is formed in the upper body 41 and extends from the bottom of the upper body 41 toward the lower body 42. The piston 48 may be formed integrally with the upper body 41. The piston 48 has a head which is formed on an end thereof farther away from the bottom of the upper body 41. The head of the piston 48 has an outer periphery placed in slidable contact with an inner wall of the cylinder 47. When the upper body 41 and the lower body 42 move relative to each other, the piston 48 and the cylinder 47 slide relative to each other.

The coil spring 25 works as a biasing mechanism and is disposed inside the upper body 41 and the lower body 42. The coil spring 25 has ends placed in contact with the bottoms of the upper body 41 and the lower body 42, respectively. The coil spring 25 is compressed to produce pressure which urges the upper and lower bodies 41 and 42 away from each other. Specifically, the coil spring 25 works to push, i.e., rotate the arm 22 about the shaft 23 in the counterclockwise direction, as viewed in FIG. 1 so as to bias the tensioner pulley 21 for increasing the degree of tension of the belt 9 between the driving pulley 4 and the given accessory pulley 5.

The stroke inhibitor 50 works as a position holding mechanism and includes a first fluid chamber 51, a second fluid chamber 52, fluid 53, connecting paths 54 and 55, seats 56 and 57, a valve ball 58, and a control valve 60.

The first fluid chamber 51 is defined by the bottom of the lower body 42 and the piston 48 within the cylinder 47 of the lower body 42. The first fluid chamber 51 has a volume which decreases with the contraction of the tensioner body 40 and increases with the expansion of the tensioner body 40.

The second fluid chamber 52 is defined by an inner wall of the lower body 42, an outer wall of the cylinder 47, and an inner wall of the upper body 41.

The fluid 53 is, for example, oil or gas and occupies the first fluid chamber 51 and the second fluid chamber 52.

The connecting paths 54 and 55 are formed in the bottom of the lower body 42 and connect between the first fluid chamber 51 and the second fluid chamber 52. When the tensioner body 40 contracts or expands in the axial direction thereof, the volume of the first fluid chamber 51 changes, thus causing the fluid 53 to flow between the first fluid chamber 51 and the second fluid chamber 52 through the connecting path 57 or 58.

The seat 56 is formed on an inner wall of the connecting path 54 and tapers away from the first fluid chamber 51. The seat 57 is formed on an inner wall of the connecting path 55 and tapers away from the first fluid chamber 51.

The valve ball 58 is of a spherical shape and disposed in the connecting path 54 so that it selectively rests on or leaves the seat 56. Specifically, when the tensioner body 40 contracts, it will urge the fluid 53 to flow from the first fluid chamber 51 to the second fluid chamber 52 through the connecting path 54, thereby pressing the valve ball 58 into abutment with the seat 56 to block fluid communication between the first fluid chamber 51 and the second fluid chamber 52 through the connecting path 54. Alternatively, when the tensioner body 40 expands, it will urge the fluid 53 to flow from the second fluid chamber 52 to the first fluid chamber 51 through the connecting path 54, thereby moving the valve ball 58 away from the seat 56 to establish the fluid communication between the first fluid chamber 51 and the second fluid chamber 52 through the connecting path 54.

The control valve 60 is installed in the lower body 42 of the tensioner body 40. The control valve 60 includes a stator 61, a coil 62, a movable stem 63, a spring 64, a valve ball 65, and a connecting rod 66.

The stator 61 is of a cylindrical shape and made from metal such as iron. The stator 61 is disposed near the bottom of the lower cylinder 42 and has an axis aligned with the length of a major part of the connecting path 55. The coil 62 is wound around the stator 61. The movable stem 63 is of a cylindrical shape and made from metal such as iron. The movable stem 63 is disposed inside the stator 61 to be reciprocable in an axial direction thereof. The spring 64 is made of, for example, a coil spring and installed on one of ends of the movable stem 63 which is farther away from the lower body 42. The spring 64 works to urge the movable stem 63 toward the lower body 42. The valve ball 65 is of a spherical shape and disposed in the connecting path 55 so that it selectively rests on or leaves the seat 57. The connecting rod 66 joints the movable stem 63 and the valve ball 65 together so as to keep a positional relation therebetween as it is. When the movable stem 63 is urged by the spring 64 against the lower body 42 (i.e. in the rightward direction, as viewed in FIG. 2), the valve ball 65 is separate from the seat 57 to establish fluid communication between the first fluid chamber 51 and the second fluid chamber 52.

In operation, when the coil 62 is supplied with electric power so that it is energized, it will create a flow of magnetic flux through the stator 61 and the movable stem 63, thereby magnetically attracting the movable stem 63 to the spring 64 (i.e., away from the lower body 42) against the pressure, as produced by the spring 64. This causes the valve ball 65 to rest on the seat 57 to block the fluid communication between the first fluid chamber 51 and the second fluid chamber 52 through the connecting path 55. Alternatively, when the coil 62 is deenergized, the magnetic flux will disappear from the stator 61 and the movable stem 63, thereby moving the movable stem 63 toward the lower body 42 with aid of the pressure, as produced by the spring 64. This causes the valve ball 65 to be moved away from the seat 57 to establish the fluid communication between the first fluid chamber 51 and the second fluid chamber 52 through the connecting path 55.

When the coil 62 is energized, so that the valve ball 65 rests on the seat 57, the flow of the fluid 53 from the first fluid chamber 51 to the second fluid chamber 52 is blocked by both the valve balls 58 and 65, but the fluid 53 is permitted to flow from the second fluid chamber 52 to the first fluid chamber 51 through the connecting path 54. This stops the tensioner body 40 from contracting, but permits the tensioner body 40 to expand.

Alternatively, when the coil 62 is in the deenergized state, so that the valve ball 65 is separate from the seat 57, the flow of the fluid 53 from the first fluid chamber 51 to the second fluid chamber 52 through the connecting path 54 is blocked by the valve ball 58, but the fluid 53 is permitted to flow from the first fluid chamber 51 to the second fluid chamber 52 or vice versa through the connecting path 55. This permits the tensioner body 40 to selectively expand and contract.

The control valve 60, as apparent from the above discussion, works as a contraction inhibitor to block the fluid communication between the first fluid chamber 51 and the second fluid chamber 52 through the connecting path 55 by means of the energization of the coil 62 to inhibit the tensioner body 40 from contracting.

The tensioner body 40 is, as described above, capable of expanding or contracting in the axial direction thereof to swing the tensioner pulley 21 relative to the engine 2 to change the degree of tension of the belt 9. The spring 29 works to urge the tensioner body 40 to expand in the axial direction thereof. The stroke inhibitor 50 serves as the contraction inhibitor selectively to stop the tensioner body 40 from contracting. The auto-tensioner 20 severs to eliminate the loosening of the belt 9 between the driving pulley 4 and the given accessory pulley 5 in the regenerative mode of operation of the given accessory 11.

The ECU 70 is implemented by a compact computer equipped with a CPU, a ROM, a RAM, and an input-output device. The ECU 70 works as a unified controller to monitor outputs from sensors installed in the vehicle and execute tasks or programs, as stored in the ROM, to control or manage operations of devices mounted in the vehicle.

The ECU 70 analyzes the outputs from the sensors to control the operations of the given accessory 11 and the control valve 60.

The engine 2 is equipped with a rotation sensor (also called a position sensor) 71 which works to measure an angular position of the driving pulley 4 (i.e., the drive shaft 3) and provide a signal indicative thereof to the ECU 70. The ECU 70 analyzes the output from the rotation sensor 71 to determine the angular position and rotating speed of the driving pulley 4.

The vehicle has a brake switch 72 installed on a driver's seat. The brake switch 72 measures a position of a brake pedal installed in the vehicle, that is, the amount by which the brake pedal is depressed by a vehicle driver and outputs a signal indicative thereof to the ECU 70. The ECU 70 analyzes the output from the brake switch 72 and determines the amount by which the brake pedal is depressed or whether the brake pedal is being depressed or not.

The power transmission system 1 also includes an angular position sensor 73 (also referred to as a rotation angle sensor) installed on a housing 19 of the given accessory 11. The angular position sensor 73 measures an angular position (i.e., a rotation angle) of the given accessory pulley 5 (i.e., the shaft 12 of the given accessory 11) and outputs a signal indicative thereof to the ECU 70. The ECU 70 analyzes the output from the angular position sensor 73 to determine the angular position (i.e., the rotation angle), the angular velocity, and the rotation speed of the given accessory pulley 5.

The ECU 70 also works to sequentially operates in a reverse rotation control mode, a stroke inhibition mode, an engine start mode, and an inhibition releasing mode, which will be described below in detail.

The reverse rotation control mode is to control the operation of the given accessory 11 to rotate the given accessory 11 in a reverse direction when or after an engine stop condition to stop the engine 2 is met, thereby causing the belt 9 to extend, that is, loosening the tension of the belt 9 between the driving pulley 4 and the given accessory pulley 5 to cause the tensioner body 40 to extend in the axial direction thereof with aid of the coil spring 25. The reverse direction is a direction opposite the normal direction in which the given accessory 11 rotates in the motor mode, for example, when it is required to start the engine 2. The engine stop condition for the engine 2 is, for example, a condition where after the vehicle stops, the rotation sensor 71 detects the fact that the speed of the driving pulley 4 (i.e., the drive shaft 3) has dropped below a given value.

The inhibition mode is to control the operation of the control valve 60 of the stroke inhibitor 50 to inhibit the contracting stroke of the tensioner body 40.

The engine start mode is to actuate the given accessory as the engine starter in the motor mode to start the engine 2.

The inhibition-releasing mode is to control the operation of the control valve 60 of the stroke inhibitor 50 to release the inhibition of the contacting stroke.

The ECU 70 also works as a reversing timing calculator to predict the timing when the drive shaft 3 will start being rotated in the reverse direction by the operation of the reverse rotation control mode. Such a timing will also be referred to as a reversing timing below. The ECU 70 controls the operation of the given accessory 11 based on the reversing timing.

The prediction of the reversing timing, as made by the ECU 70, will be described below with reference to FIG. 3.

Figure 3:
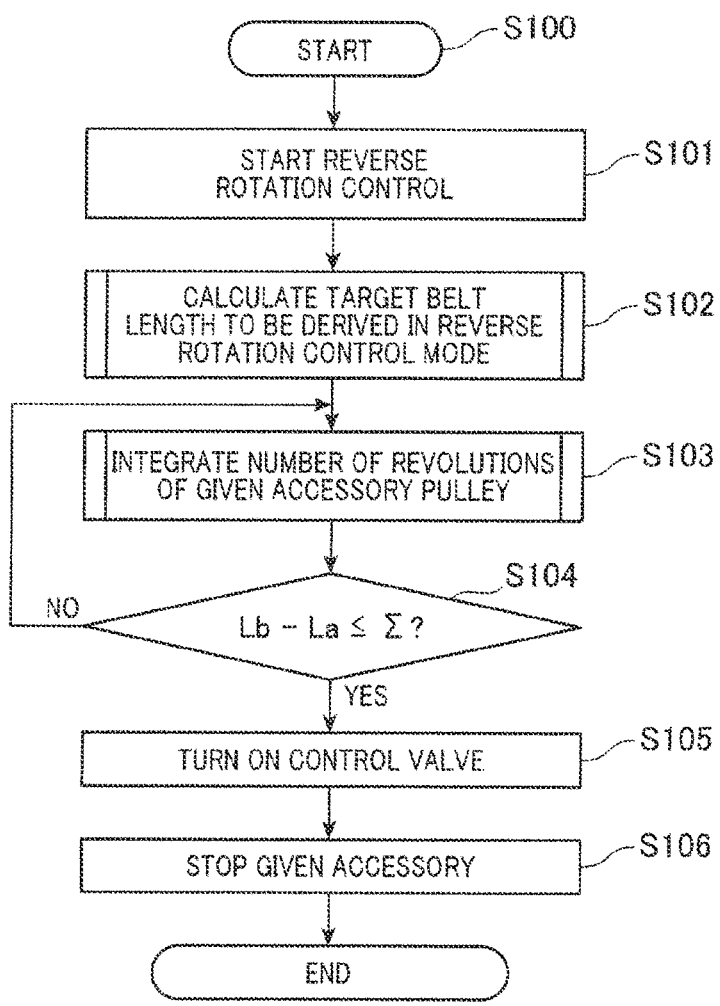
FIG. 3 is a flowchart of a sequence of logical steps or timing determination program executed by a controller of the power transmission system of FIG. 1.

FIG. 3 is a flowchart of a sequence of logical steps or reversing timing determination program executed by the ECU 70 when or after the engine stop condition to stop the engine 2 is satisfied.

Specifically, when or after the engine stop condition is met, the routine enters step S100 to initiate the reversing timing determination program. The routine then proceeds to step S101 wherein the ECU 70 starts controlling the operation of the given accessory 11 for rotating it in the reverse direction. When the given accessory 11 starts rotating in the reverse direction, it will cause the belt 9 between the driving pulley 4 and the given accessory pulley 5 to be loosened. The tensioner body 40 is, therefore, extended by the pressure, as produced by the coil spring 25, so that the tensioner pulley 21 moves relative to the engine 2. The operation in step S101 corresponds to an operation at the initial stage of the reverse rotation control mode, as described above.

The routine then proceeds to step S102 wherein the ECU 70 calculates a target belt length Lb that is a target length of the belt 9 to be achieved by the reverse rotation control mode and required for meeting a desired degree of tension of the belt 9 when the given accessory 11 is actuated in the motor mode.

If a target belt tension that is a target value of tension of the belt 9 to be achieved by the reverse rotation control mode is Ten, a length of the belt 9 at a time when the reverse rotation control mode starts to be executed is La, a strain of the belt 9 is $\epsilon$, a sectional area of the belt 9 is A, and a modulus of elasticity of the belt 9 is E, a relation between the strain and the tension of the belt 9 is expressed as $$\epsilon = Ten/(A \times E) \quad (1)$$

The target belt length Lb is $$Lb = La(1+\epsilon) \quad (2)$$

The ECU 70 calculates the target belt length Lb according to Eqs. (1) and (2).

After the target belt length Lb is determined in step S102, the routine proceeds to step S103 wherein the ECU 70 adds up the number of revolutions per minute of the given accessory (i.e., the given accessory pulley 5), in other words, calculates how much angle the given accessory pulley 5 has rotated.

Specifically, if the radius of the given accessory pulley 5 is $R_{ISG}$, the speed of revolution (i.e., the number of revolutions per minute) of the given accessory pulley 5 is $Ne_{ISG}$, the angular velocity of the given accessory pulley 5 is $\omega_{ISG}$, and the time when the tensioner body 40 is to complete the extension thereof is t (i.e., the time when the drive shaft 5 is expected to start reversing), a target amount of extension Lb−La of the belt 9 to be derived when the tensioner body 40 completes the extension thereof, that is, immediately before or when the drive shaft 3 is expected to start reversing is given by $$\sum_{i=0}^{t} (R_{ISG} \times \omega_{ISGi}) \quad (3)$$

where $$\omega_{ISGi} = Ne_{ISGi} \times 2\pi/60 \quad (4)$$

The ECU 70 calculates $NE_{ISGi}$ and $\omega_{ISGi}$ using the output from the angular position sensor 73 and totalizes the number of revolutions of the given accessory 11 (i.e., the given accessory pulley 5) to determine the amount by which the belt 9 has been extended.

After step S103, the routine proceeds to step S104 wherein it is determined whether the value, as calculated according to Eq. 3, is greater than the target amount of extension Lb−La of the belt 9 or not. If a YES answer is obtained meaning that the value, as calculated according to Eq. 3, is greater than the target amount of extension Lb−La of the belt 9, then the routine proceeds to step S105. Alternatively, if a NO answer is obtained, then the routine returns back to step S103.

In step S105, the ECU 70 turns on the control valve 60, that is, energizes the coil 62. Specifically, the ECU 70 actuates the control valve 60 to block the fluid communication between the first fluid chamber 51 and the second fluid chamber 52 to inhibit or stop the tensioner body 40 from contracting. This keeps the tensioner body 40 in an extended state, that is, holds the belt 9 in a state where the belt 9 has been extended by the target amount of extension Lb−La immediately before the drive shaft 3 starts to reverse. The operation in step S105 corresponds to the operation of the stroke inhibition mode, as described above.

The routine proceeds to step S106 wherein the ECU 70 stops reversing the given accessory 11. The operation in step S106 corresponds to an operation at the final stage of the reverse rotation control mode. After step S106, the routine terminates.

The ECU 70 calculates the target tension Ten of the belt 9 as a function of specifications (e.g., the section area A, the modulus of elasticity E, and the strain ε of the belt 9) in step S102, and predicts, in steps S103 and S104, the reversing timing when the drive shaft 3 is expected to start reversing as a function of the target belt tension Ten and the target amount of extension Lb−La of the belt 6 which will achieve the target belt tension Ten.

As apparent from the above discussion, the ECU 70 works as the reversing timing calculator to perform the reversing timing determination program of FIG. 3 and controls the operation of the given accessory 11 based on the calculated reversing timing.

After completion of the reversing timing determination program, the ECU 70 performs the engine start mode to operate the given accessory 11 in the motor mode for starting the engine 2.

The ECU 70 works to execute a reverse rotation control step (i.e., a sequence of steps S101 to 104) to control the operation of the given accessory 11 in order to extend the tensioner body 40 in the axial direction thereof and then execute a stroke inhibition step (i.e., step S105) to hold the tensioner body 40 from contracting. This will result in an increased degree of tension of the belt 9 when it is required to operate the given accessory 11 as the engine starter in the engine start mode, thereby minimizing the slippage of the belt 9 on the pulleys 4, 5, 6, and 7.

After completion of the engine start step, the ECU 70 executes a stroke inhibition releasing step to turn off the control valve 60 to permit the tensioner body 40 to contract. This causes the tensioner body 40 to return back to the initial position at which the tensioner body 40 lies before the execution of the reverse rotation control step. Thus, after the stroke inhibition releasing step, the tension of the belt 9 which has been increased by the reverse rotation control step drops.

Figure 4:
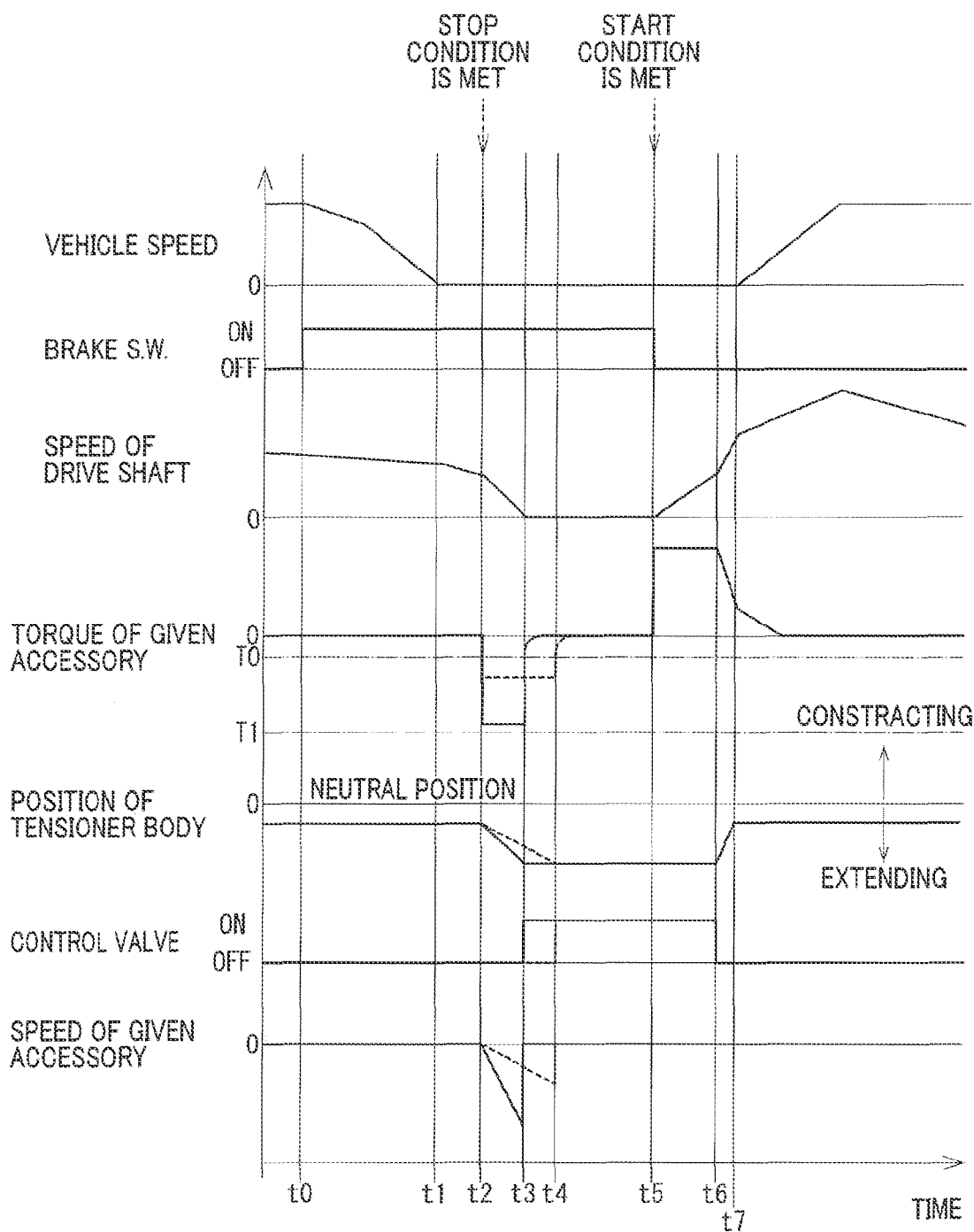
FIG. 4 is a time chart which demonstrates operations of the power transmission system of FIG. 1.

An example of the operation of the power transmission system 1 will be described below with reference to FIG. 4.

When the vehicle operator depresses the brake pedal at time t0, the brake switch 72 is turned on. The vehicle, then, decelerates and stops at time t1. When the speed of the drive shaft 3 has dropped below a given value at time t2, the engine stop condition is met. The ECU 70, thus, stops spraying fuel from fuel injectors, not shown, into the engine 2, so that the speed of the drive shaft 3 further decreases. The drive shaft 3 stops at time t3.

When the engine stop condition is satisfied at time t2, the ECU 70 initiates the reverse rotation control step and actuates the given accessory 11 to output the torque in the reverse rotation. The speed of rotation of the given accessory 11 in the reverse direction increases between time t2 and time t3. This causes the tensioner body 40 to extend further. T0, as indicated by a broken line in FIG. 4, represents a degree of torque, as outputted by the given accessory 11, which permits the tensioner body 40 to extend in the axial direction thereof. T1, as indicated by a broken line in FIG. 4, represents a degree of torque, as outputted by the given accessory 11, which will cause the drive shaft 3 to start reversing.

When the belt 9 has been extended by the amount of extension Lb−La, in other words, the tensioner body 40 has extended fully at time t3, the ECU 70 turns on the control valve 60 to stop the tensioner body 40 from contracting and stops the given accessory 11 to rotating in the reverse direction. This keeps the tension of the belt 9 at an increased degree.

When the vehicle operator has released the brake pedal at time t5, the brake switch 72 is turned off, so that the engine start condition is satisfied. The ECU 70 thus executes the engine start step to operate the given accessory 11 as the engine starter in the motor mode. The given accessory 11 outputs the torque in the normal direction to crank the engine 2. At time t6, the ECU 70 actuates the fuel injectors to resume spraying the fuel into the engine 2, so that the engine 2 is fully fired up. Simultaneously, at time t6, the ECU 70 turns off the control valve 60 to release the inhibition of contraction of the tensioner body 40. This causes the tensioner body 40 to return back at time t6 and reach the initial position at time t7 where the tensioner body 40 lies before the execution of the reverse rotation control step at time t2. When the vehicle operator depresses the accelerator pedal, not shown, the speed of the vehicle increases.

At time t7, the tensioner body 40, as described above, has reached the initial position at which the tensioner body 40 lies before the execution of the reverse rotation control step, thereby causing the tension of the belt 9 which has been increased at time t3 to drop and be kept at a decreased degree after time t7. This avoids an undesirable increase in frictional resistance of the belt 9 against each of the pulleys 4 to 7 and minimizes the wear or damage to the belt 9 after time t7 when the engine 2 is rotating, and the given accessory 11 is operating in the regenerative mode.

Next, an operation of a comparative example of a power transmission system will be discussed below with reference to FIG. 4.

The power transmission system, as referred to herein as the comparative example, has substantially the same physical structure as that of the power transmission system 1, but is different in degree of torque outputted by the given accessory 11 in the reverse direction during the execution of the reverse rotation control step. Operations of parts of the power transmission system are represented by broken lines in FIG. 4.

In the comparative example of the power transmission system, the torque outputted by the given accessory 11 in the reverse rotation control step (i.e., after time t2) is lower than that produced by the power transmission system 1 of this embodiment. This causes the tensioner body 40 to complete extension thereof at time t4. In other words, the power transmission system 1 of this embodiment is capable of completing the extension of the tensioner body 40 earlier than the comparative example.

(1) As apparent from the above discussion, the power transmission system 1 of this embodiment has the driving pulley 4 joined to the drive shaft 3 of the engine 2 to be rotatable along with the drive shaft 3. The given accessory pulley 5 is attached to the shaft 12 of the given accessory 11 which is operable either in the motor mode or the regenerative mode so that it is rotatable along with the shaft 12. The accessory pulleys 6 and 7 are attached to the shafts 14 and 16 of the accessories 13 and 15 to be rotatable along with the shafts 14 and 15. The belt 9 is wound around the driving pulley 4, the given accessory pulley 5, and the accessory pulleys 6 and 7 to transmit torque of each of the pulleys 4, 6, and 7 to another.

The auto-tensioner 20 has the tensioner pulley 21, the tensioner body 40, the coil spring 25 working as the biasing mechanism, and the stroke inhibitor 50. The tensioner pulley 21 is swingable in contact with the belt 9 between the driving pulley 4 and the given accessory pulley 5 and also movable relative to the engine 2. The tensioner body 40 is telescopic in the axial direction thereof to move the tensioner pulley 21 relative to the engine 2. The coil spring 25 biases the tensioner body 40 to extend in the axial direction thereof. The stroke inhibitor 50 works to optionally hold the tensioner body 40 from contracting.

The auto-tensioner 20 works to extend or contract the tensioner body 40 to move the tensioner pulley 21 relative to the engine 2, thereby automatically regulating the tension of the belt 9. The auto-tensioner 20 serves to eliminate the loosening of the belt 9 between the driving pulley 4 and the given accessory pulley 5, for example, when the given accessory 11 starts to operate in the regenerative mode.

The ECU 70 works to execute the reverse rotation control step to control the operations of the given accessory 11 and the stroke inhibitor 50. When or after the engine stop condition for the engine 2 is met, the ECU 70 rotates the given accessory 11 in the reverse direction that is a direction opposite that in which the given accessory 11 operates in the motor mode, thereby loosening the belt 9 between the driving pulley 4 and the given accessory pulley 5 to cause the tensioner body 40 to extend in the axial direction thereof through the coil spring 25. Additionally, the ECU 70 also executes the stroke inhibition step to control the operation of the stroke inhibitor 50 to hold the tensioner body 40 from contracting. The ECU 70 then executes the engine start step to operate the given accessory 11 in the motor mode to crank the engine 2 and finally executes the inhibition releasing step to control the operation of the stroke inhibitor 50 to permit the tensioner body 40 from contracting.

The ECU 70 also functions as the timing calculator to predict the reversing timing when the drive shaft 3 will start being reversed by the execution of the reverse rotation control step. The ECU 70 controls the operation of the given accessory 11 based on the reversing timing in the reverse rotation control step.

Specifically, the ECU 70 controls the operation of the given accessory 11 so as to extend the tensioner body 40 in the axial direction thereof for increasing the tension of the belt 9 in the reverse rotation control step. This keeps the tension of the belt 9 increased when it is required to start the given accessory 11 to operate in the motor mode in the engine start step, thereby minimizing the slippage of the belt 9 on each of the pulleys 4, 5, 6, and 7 when the engine 2 is cranked.

After the engine 2 starts, the ECU 70 executes the inhibition releasing step to cause the tensioner body 40 to contract, thereby decreasing the tension of the belt 9 which has been increased by the reverse rotation of the given accessory 11 in the reverse rotation control step. This avoids an undesirable increase in frictional resistance of the belt 9 and minimizes the wear or damage to the belt 9.

The ECU 70, as already described, works to predict the reversing timing when the drive shaft 3 (i.e., the engine 2) will start being reversed and control the operation of the given accessory 11 based on the reversing timing in the reverse rotation control step. Specifically, the ECU 70 stops the reverse rotation of the given accessory 11 immediately before or at the moment when the reversing timing is reached, thereby keeping the tensioner body 40 at a desired extended position without causing the drive shaft 3 to rotate in the reverse direction. This eliminates the need for finely controlling the operation of the given accessory 11 to output a degree of torque within a range which is higher than that permitting the tensioner body 40 to extend in the axial direction thereof and is lower than that causing the drive shaft 3 to rotate in the reverse direction. The power transmission system 1 of this embodiment is, therefore, capable of controlling the slippage of the belt 9 on each of the pulleys 4, 5, 6, and 7 without having to finely control the operation of the given accessory 11 when the engine 2 is cranked.

(2) The power transmission system 1 of this embodiment has the stroke inhibitor 50 which works to hold the tensioner pulley 21 at a desired extended position. The stroke inhibitor 50 includes the first fluid chamber 51, the second fluid chamber 52, the fluid 53, and the control valve 60. The first fluid chamber 51 is defined inside the tensioner body 40 and has a volume which decreases with the contraction of the tensioner body 40 and increases with the expansion of the tensioner body 40. The second fluid chamber 52 is defined inside the tensioner body 40 to be communicable with the first fluid chamber 51. The fluid 53 occupies the first fluid chamber 51 and the second fluid chamber 52. The control valve 60 is controlled in operation by the ECU 70 to establish or block the fluid communication between the first fluid chamber 51 and the second fluid chamber 52.

The ECU 70 controls the operation of the control valve 60 in the stroke inhibition step to block the fluid communication between the first fluid chamber 51 and the second fluid chamber 52 for holding the tensioner body 40 from contracting. This embodiment shows an example of structure of the stroke inhibitor 50.

(3) The ECU 70, as described above, works as the timing calculator to calculate the reversing timing. The reversing timing is the time when the drive shaft 3 will change its direction of rotation to the reverse direction and derived as a function of the angle of rotation of the given accessory pulley 5.

(4) Specifically, the ECU 70 determines the reversing timing by integrating the product of the angular velocity $\omega_{ISG}$ of the given accessory pulley 5 and the radius $R_{ISG}$ of the given accessory pulley 5.

(5) The ECU 70 also uses the amount of extension Lb−La of the belt 9 to determine the reversing timing.

This embodiment shows an example of the determination or prediction of the reversing timing when the drive shaft 3 will reverse in its direction of rotation.

(6) The ECU 70 monitors in the reverse rotation control step whether the amount of extension of the belt 9 has reached the amount of extension Lb−La or not and stops the operation of the given accessory 11 when the answer is affirmative, thereby preventing the drive shaft 3 from reversing.

(7) After starting to inhibit the tensioner body 40 from contracting in the stroke inhibition step, the ECU 70 stops the operation of the given accessory 11. This keeps the tension of the belt 9 at a desired increased degree.

Second Embodiment

Figure 5:
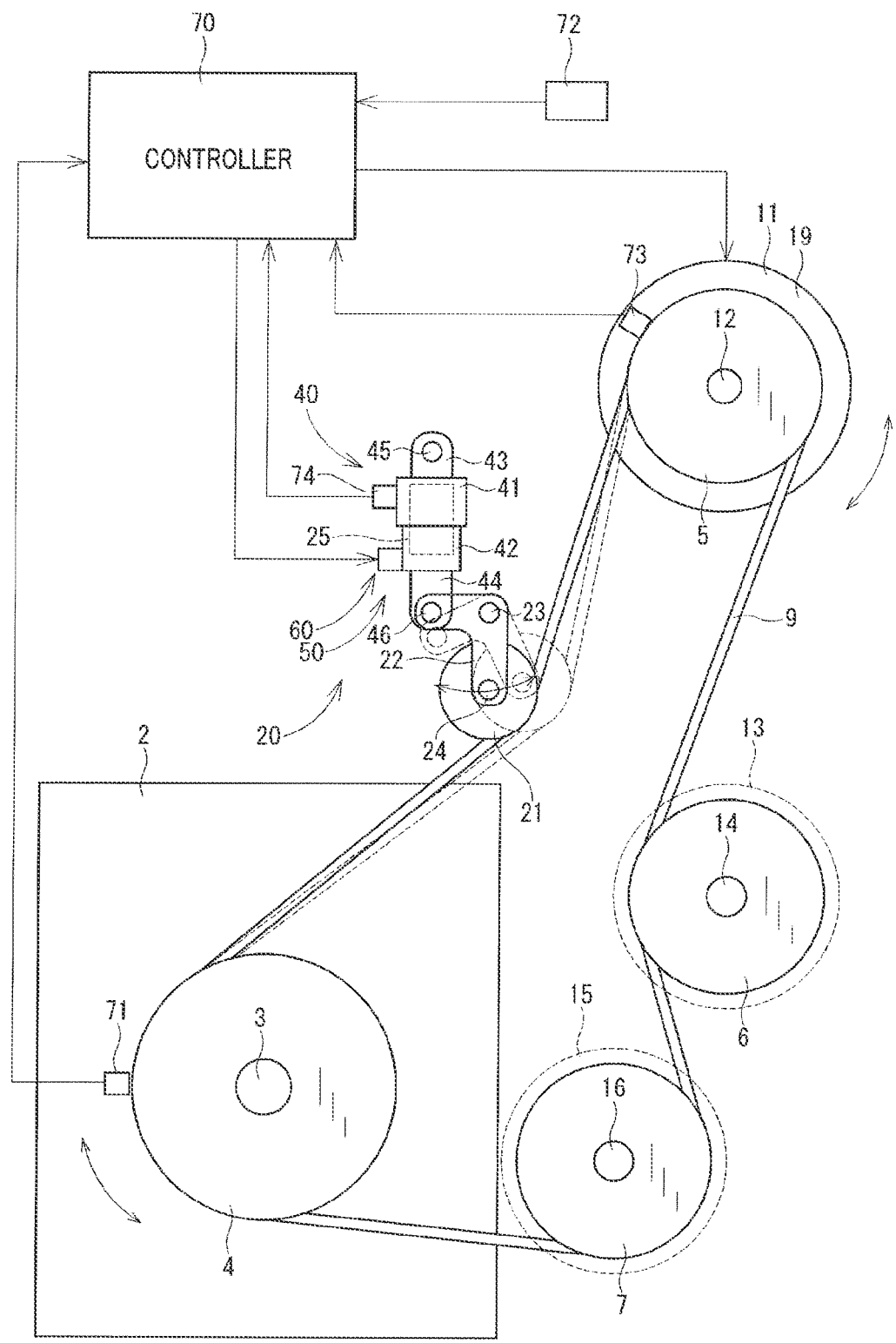
FIG. 5 is a schematic view which illustrates a power transmission system according to the second embodiment.

FIG. 5 illustrates the power transmission system 1 according to the second embodiment which is different in physical structure thereof and operation of the reverse rotation step made by the ECU 70 from the first embodiment.

The power transmission system 1 is also equipped with a position sensor 74 installed on the tensioner body 40. The position sensor 74 measures the distance between the upper body 41 and the lower body 42, that is, an extended/contracted position of the tensioner body 40. The position sensor 74 outputs a signal indicative of the position of the tensioner body 40 to the ECU 70. The ECU 70 analyzes the output from the position sensor 74 and determines the extended/contracted position of the tensioner body 40.

The prediction of the reversing timing, as made by the ECU 70, will be described below with reference to FIG. 6.

Figure 6:
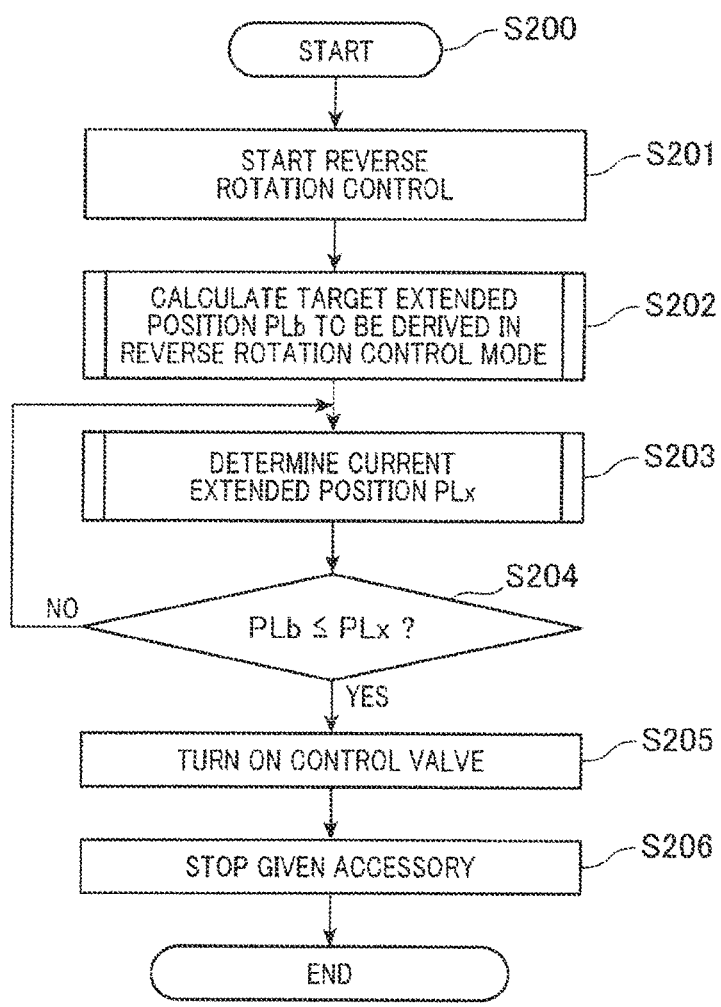
FIG. 6 is a flowchart of a sequence of logical steps or timing determination program executed by a controller of the power transmission system of FIG. 5.

FIG. 6 is a flowchart of a sequence of logical steps or reversing timing determination program executed by the ECU 70 when or after the engine stop condition to stop the engine 2 is satisfied.

Specifically, when or after the engine stop condition is met, the routine enters step S200 to initiate the reversing timing determination program. The routine then proceeds to step S201 wherein the ECU 70, like in step S101 of FIG. 3, starts controlling the operation of the given accessory 11 to rotate it in the reverse direction. When the given accessory 11 starts rotating in the reverse direction, it will cause the belt 9 between the driving pulley 4 and the given accessory pulley 5 to be loosened. The tensioner body 40 is, therefore, extended by the pressure, as produced by the coil spring 25, so that the tensioner pulley 21 moves relative to the engine 2. The operation in step S201 is the initial stage of the reverse rotation control mode, as described above.

The routine then proceeds to step S202 wherein the ECU 70 calculates a target extended position $P_{Lb}$ that is a target position to which the tensioner body 40 is to be extended by the reverse rotation control mode.

The relation between the strain and the tension of the belt 9 is, as already discussed, expressed as $$\epsilon = Ten/(A \times E) \qquad (1)$$

The target belt length Lb is $$Lb = La(1+\epsilon) \qquad (2)$$

The ECU 70 calculates the target belt length Lb according to Eqs. (1) and (2). The ECU 70 also calculates the target extended position $P_{Lb}$ as a function of the target belt length Lb. The target extended position $P_{Lb}$ may be geometrically derived using the target belt length Lb.

After the target extended position $P_{Lb}$ is determined in step S202, the routine proceeds to step S203 wherein the ECU 70 analyzes the output from the position sensor 74 to determine a current position $P_{Lx}$ of the tensioner body 40.

The routine proceeds to step S204 wherein it is determined whether the current position $P_{Lx}$ of the tensioner body 40 is greater than or equal to the target extended position $P_{Lb}$ or not. If a YES answer is obtained meaning that the tensioner body 40 has reached the target extended position $P_{Lb}$, the routine proceeds to step S205. Alternatively, if a NO answer is obtained meaning that the tensioner body 40 has not yet reached the target extended position $P_{Lb}$, then the routine returns back to step S203.

In step S205, the ECU 70, like in step S105 of FIG. 3, turns on the control valve 60, that is, energizes the coil 62. Specifically, the ECU 70 actuates the control valve 60 to block the fluid communication between the first fluid chamber 51 and the second fluid chamber 52 to inhibit or stop the tensioner body 40 from contracting. This keeps the tensioner body 40 in an extended state, that is, holds the belt 9 in a state where the belt 9 has been extended by the target amount of extension Lb−La immediately before the drive shaft 3 starts to reverse. The operation in step 205 corresponds to the operation of the stroke inhibition mode, as described above.

The routine proceeds to step S206 wherein the ECU 70 stops reversing the given accessory 11. The operation in step S206 is the final stage of the reverse rotation control mode. After step S206, the routine terminates.

The ECU 70 calculates the target tension Ten of the belt 9 as a function of specifications (e.g., the section area A, the modulus of elasticity E, and the strain $\epsilon$ of the belt 9) in step S202, and compares the target extended position $P_{Lb}$ of the tensioner body 40 where the target belt tension Ten is obtained with the current position $P_{Lx}$, as derived by the output from the position sensor 74 to determine the reversing timing when the drive shaft 3 is expected to be reversed undesirably.

As apparent from the above discussion, the ECU 70 works as the reversing timing calculator to perform the reversing timing determination program of FIG. 6 and controls the operation of the given accessory 11 based on the calculated reversing timing.

After completion of the reversing timing determination program, the ECU 70 performs the engine start mode to operate the given accessory 11 in the motor mode for starting the engine 2.

The ECU 70 works to execute the reverse rotation control step (i.e., a sequence of steps S201 to 204) to control the operation of the given accessory 11 in order to extend the tensioner body 40 in the axial direction thereof and then execute the stroke inhibition step (i.e., step S205) to hold the tensioner body 40 from contracting. This will result in an increased degree of tension of the belt 9 when it is required to operate the given accessory 11 as the engine starter in the engine start mode, thereby minimizing the slippage of the belt 9 on the pulleys 4, 5, 6, and 7.

After completion of the engine start step, the ECU 70, like in the first embodiment, executes the stroke inhibition releasing step to turn off the control valve 60 to permit the tensioner body 40 to contract. This causes the tensioner body 40 to return back to the initial position at which the tensioner body 40 lies before the execution of the reverse rotation control step. Thus, after the stroke inhibition releasing step, the tension of the belt 9 which has been increased by the reverse rotation control step drops.

Specifically, the ECU 70, like in the first embodiment, stops the reverse rotation of the given accessory 11 immediately before or at the moment when the reversing timing is reached, thereby keeping the tensioner body 40 at a desired extended position without reversing the drive shaft 3. This eliminates the slippages of the belt 9 on each of the pulleys 4, 5, 6, and 7 without the need for finely controlling the operation of the given accessory 11 when it is required to start the engine 2, which avoids an undesirable increase in frictional resistance of the belt 9 and minimizes the wear or damage to the belt 9.

(7) The power transmission system 1 is, as described above, equipped with the position sensor 74 which measures the extended/contracted position of the tensioner body 40. Specifically, the ECU 70 determines the reversing timing when the drive shaft 3 is expected to be reversed as a result of an excess in tension of the belt 9 as a function of the position of the tensioner body 40, as detected by the position sensor 74.

(8) The ECU 70 also uses the amount of extension Lb−La of the belt 9 to determine the reversing timing.

This embodiment shows an example of the determination or prediction of the reversing timing when the drive shaft 3 will reverse in its direction of rotation.

(9) The ECU 70 monitors in the reverse rotation control step whether the position of the tensioner body 40, as measured by the position sensor 74, has reached (or exceeded) a given value or not and stops the operation of the given accessory 11 when the answer is affirmative meaning that the position of the tensioner body 40 has reached or exceeded the given value, thereby preventing the drive shaft 3 from reversing.

Third Embodiment

The power transmission system 1 according to the third embodiment will be described below which is different in how the ECU 70 determines the reversing timing from the first embodiment. Other arrangements are identical, and explanation thereof in detail will be omitted here.

When it is required to predict the reversing timing when the drive shaft 3 is expected to reverse, the ECU 70 analyzes the output from the angular position sensor 73 to determine the angular position of the given accessory pulley 5 and calculates the reversing timing as a function of the angular position of the given accessory pulley 5 and a target angular position $\theta_{ISG}$ of the given accessory pulley 5 to be achieved in the reverse rotation control step. The target angular position $\theta_{ISG}$ is given by $$\theta_{ISG}=(Lb-La)/2\pi R_{ISG} \quad (5)$$

Specifically, when the reversing timing is reached, that is, the angular position of the given accessory pulley 5, as measured by the position sensor 73, reaches the target angular position $\theta_{ISG}$, the ECU 70 stops the reverse rotation of the given accessory 11 and holds the tensioner body 40 from contracting. This keeps the tension of the belt 9 at a desired increased degree, which will achieve a quick start of the engine 2 in the engine start step.

MODIFICATIONS

The stroke inhibitor 50 of the power transmission system 1 of the above embodiments includes the first fluid chamber 51, the second fluid chamber 52, the fluid 53, and the control valve 60. The ECU 70 controls the operation of the control valve 60 to inhibit the contraction of the tensioner body 40, thereby keeping the tension of the belt 9 at a desired degree through the tensioner pulley 21, however, the stroke inhibitor 50 may alternatively be designed to have another structure as long as it is capable of control or inhibit the contracting stroke of the tensioner body 40 in response to a control signal from the ECU 70.

The power transmission system 1 of the above embodiments holds the tensioner body 40 from contracting and then stops the operation of the given accessory 11, however, the ECU 70 may alternatively be designed to stop the given accessory 11 and then start inhibiting the contracting stroke of the tensioner body 40.

The engine stop condition to stop the engine 2, as used in the above embodiments, is the condition where after the vehicle stops, the rotation sensor 71 detects the fact that the speed of the driving pulley 4 (i.e., the drive shaft 3) has dropped below the given value, but may alternatively be a condition where a given period of time has passed after the vehicle is stopped, that is, the speed of the vehicle has dropped to zero.

The engine start condition to start the engine 2, as used in the above embodiments, is the condition where the vehicle driver has released the brake pedal, so that the brake switch 72 is turned off, however, may alternatively be a condition where an output from a brake pedal position sensor which measures the position of the brake pedal or brake pressure sensor which measures the pressure of brake fluid has dropped below a given value.

The power transmission system 1 may alternatively be designed to have one or more than two accessories and one or more than two accessory pulleys.

The power transmission system 1 may also be equipped with an additional accessory pulley disposed, for example, between the tensioner pulley 21 and the given accessory pulley 5.

Instead of the endless belt 9 made of rubber, a metallic endless chain may be used.

The transmission (e.g., an automatic transmission) which is installed in the automotive vehicle in mechanical connection with the drive shaft 3 (i.e., the output shaft of the engine 2), as referred to above, is used as an object driven by the torque outputted from the engine 2, however, transmissions installed in other vehicles may be used to be driven by the output of the engine 2 in the above embodiments. Alternatively, machines other than the transmission may be used to be driven by the output of the engine 2 in the above embodiments.

The power transmission system 1 of the above embodiments has the tensioner pulley 21 disposed between the driving pulley 4 (i.e., the crankshaft of the engine 2) and the given accessory pulley 5, however, the tensioner pulley 21 may alternatively be located upstream of the driving pulley 4 in the normal direction of the belt 9. For instance, the given accessory 11 may be replaced in position with the accessory pulley 7. In this case, the auto-tensioner 20 is capable of increasing the degree of tension of the belt 9 between the driving pulley 4 and the given accessory pulley 5 through the reverse rotation of the given accessory 11.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A power transmission system which works to transmit power, as produced by an internal combustion engine, to a first auxiliary device and a second auxiliary device, the first auxiliary device being operable either in a power mode or in a regenerative mode, comprising:

a driving pulley which is joined to a drive shaft of the internal combustion engine to be rotatable along with rotation of the drive shaft;

a first auxiliary device pulley which is joined to a shaft of the first auxiliary device to be rotatable along with rotation of the shaft of the first auxiliary device;

a second auxiliary device pulley which is joined to a shaft of the second auxiliary device to be rotatable along with rotation of the shaft of the second auxiliary device;

an endless transmitting member which is wound around the driving pulley, the first auxiliary device pulley, and the second auxiliary device pulley;

a tensioner pulley which is rotatable in contact with the endless transmitting member, the tensioner pulley being also movable relative to the internal combustion engine;

an auto-tensioner which is equipped with a tensioner body, the tensioner body working to extend or contract in a given direction to move the tensioner pulley relative to the internal combustion engine, thereby changing a degree of tension of the endless transmitting member;

a biasing mechanism which biases the tensioner body to extend in the given direction;

a stroke inhibitor which works to inhibit the tensioner body from contracting;

a controller which operates in a reverse rotation control mode, a stroke inhibition mode, an engine start mode, and an inhibition releasing mode, the reverse rotation control mode being entered when or after an engine stop condition to stop the internal combustion engine is met to rotate the first auxiliary device in a reverse direction that is opposite a direction in which the first auxiliary device rotates in the power mode, thereby loosening the endless transmission member between the driving pulley and the first auxiliary device pulley to cause the tensioner body to extend in the given direction for increasing the tension of the endless transmitting member, the stroke inhibition mode being to control an operation of the stroke inhibitor to inhibit the tensioner body from contracting, the engine start mode being to operate the first auxiliary device in the power mode to start the internal combustion engine, the inhibition releasing mode being to control the operation of the stroke inhibitor to permit the first auxiliary device to contract, the controller calculating a reversing timing when the drive shaft is expected to start being reversed by an operation of the reverse rotation control mode, the controller controlling the operation of the first auxiliary device based on the reversing timing in the reverse rotation control mode.

2. A power transmission system as set forth in claim 1, wherein the stroke inhibitor includes a first fluid chamber, a second fluid chamber, a fluid, and a control valve, the first fluid chamber being formed in the tensioner body to have a volume which decreases with contraction of the tensioner body and increases with extension of the tensioner body, the second fluid chamber being formed in the tensioner body in fluid communication with the first fluid chamber, the fluid being within the first fluid chamber and the second fluid chamber, the control valve being driven by the controller to selectively establish and block fluid communication between the first fluid chamber and the second fluid chamber, and wherein in the stroke inhibition mode, the controller controls an operation of the control valve to block the fluid communication between the first fluid chamber and the second fluid chamber, thereby inhibiting the contraction of the tensioner body.

3. A power transmission system as set forth in claim 1, wherein the controller calculates the reversing timing based on an angular position of the first auxiliary device pulley.

4. A power transmission system as set forth in claim 1, wherein the controller calculates the reversing timing based on a value derived by integrating a product of an angular velocity of the first auxiliary device pulley and a radius of the first auxiliary device pulley.

5. A power transmission system as set forth in claim 1, wherein the controller calculates the reversing timing based on an amount of extension of the endless transmitting member.

6. A power transmission system as set forth in claim 5, wherein when the amount of extension of the endless transmitting member has increased to be greater than equal to a given value in the reverse rotation control mode, the controller stops an operation of the first auxiliary device in the reverse rotation control mode.

7. A power transmissions system as set forth in claim 1, further comprising a position sensor which measures a position of the tensioner body when extending or contracting, and wherein the controller determines the reversing timing based on the position of the tensioner body, as measured by the position sensor.

8. A power transmissions system as set forth in claim 7, wherein the controller determines the reversing timing based on an amount of extension of the endless transmitting member and the position of the tensioner body, as measured by the position sensor.

9. A power transmission system as set forth in claim 7, wherein when the position of the tensioner body, as measured by the position sensor, has reached a given value or more, the controller stops an operation of the first auxiliary device in the reverse rotation control mode.

10. A power transmission system as set forth in claim 1, wherein in the stroke inhibition mode, the controller inhibits the contraction of the tensioner body and then stops an operation of the first auxiliary device.

11. A power transmission system as set forth in claim 1, wherein the first tensioner pulley is disposed between the driving pulley and the first auxiliary device pulley or between the driving pulley and the second auxiliary device pulley.

* * * * *